Nov. 29, 1927.  1,651,036
W. J. MILLER
APPARATUS FOR FEEDING GLASS
Filed Aug. 15, 1922   6 Sheets-Sheet 5
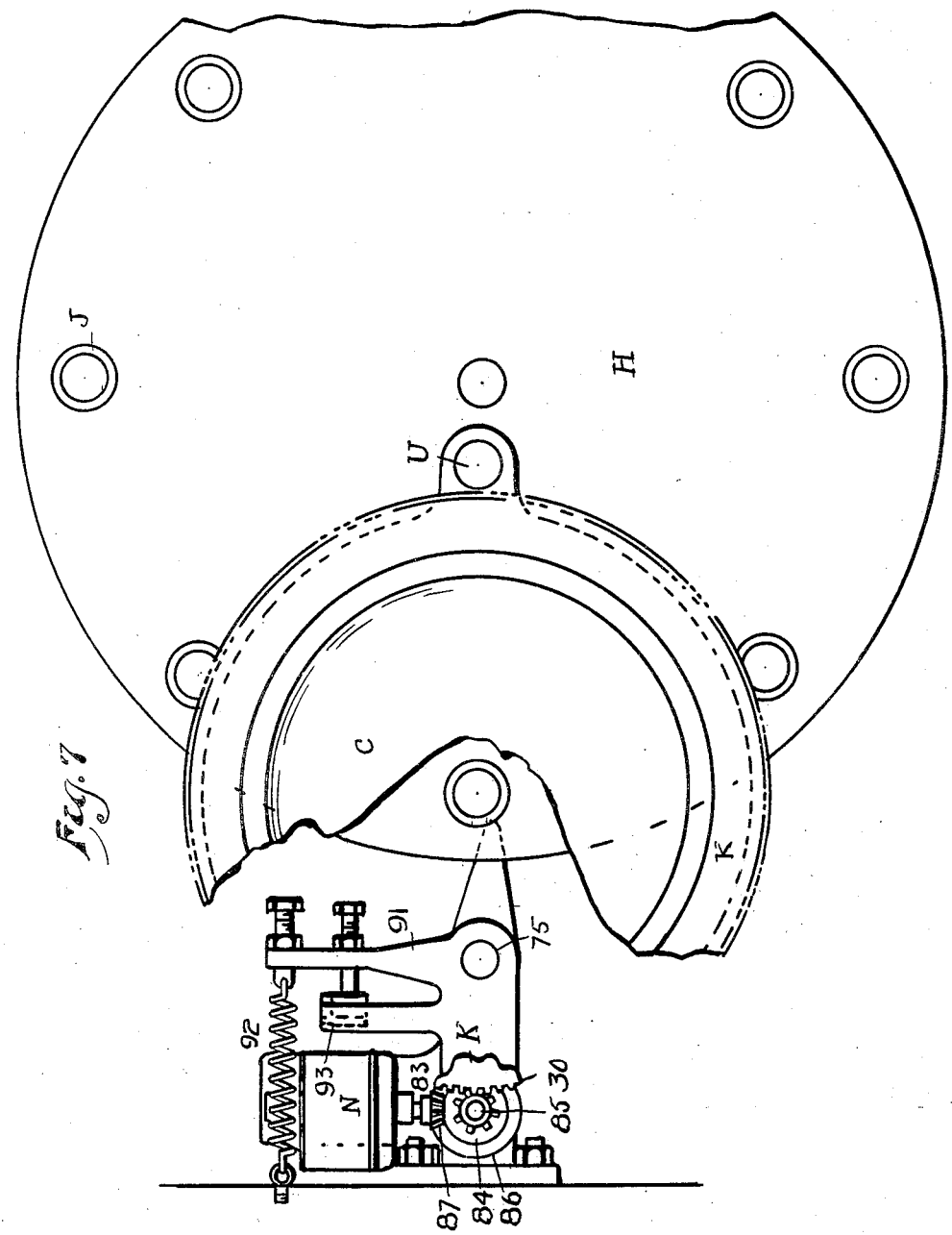

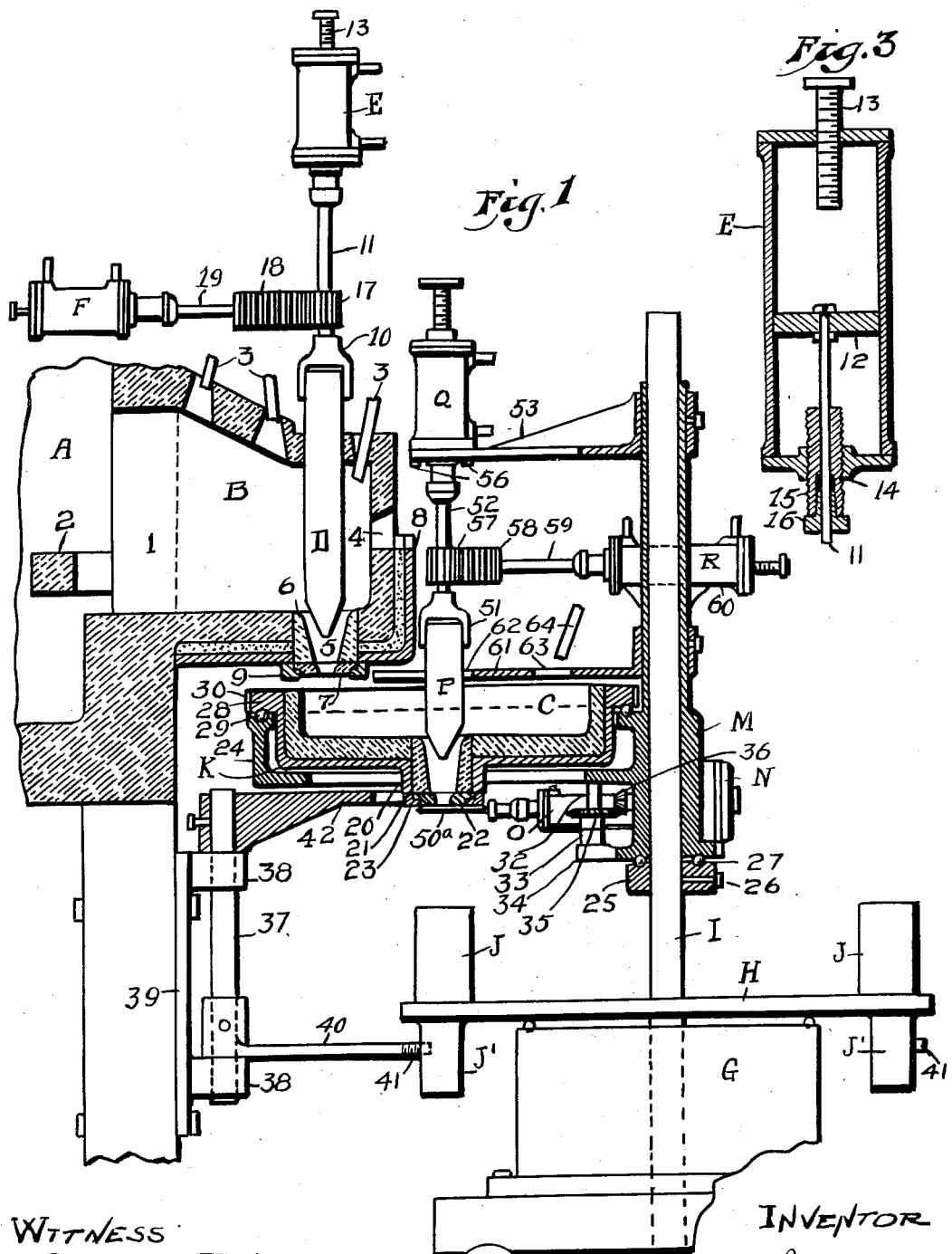

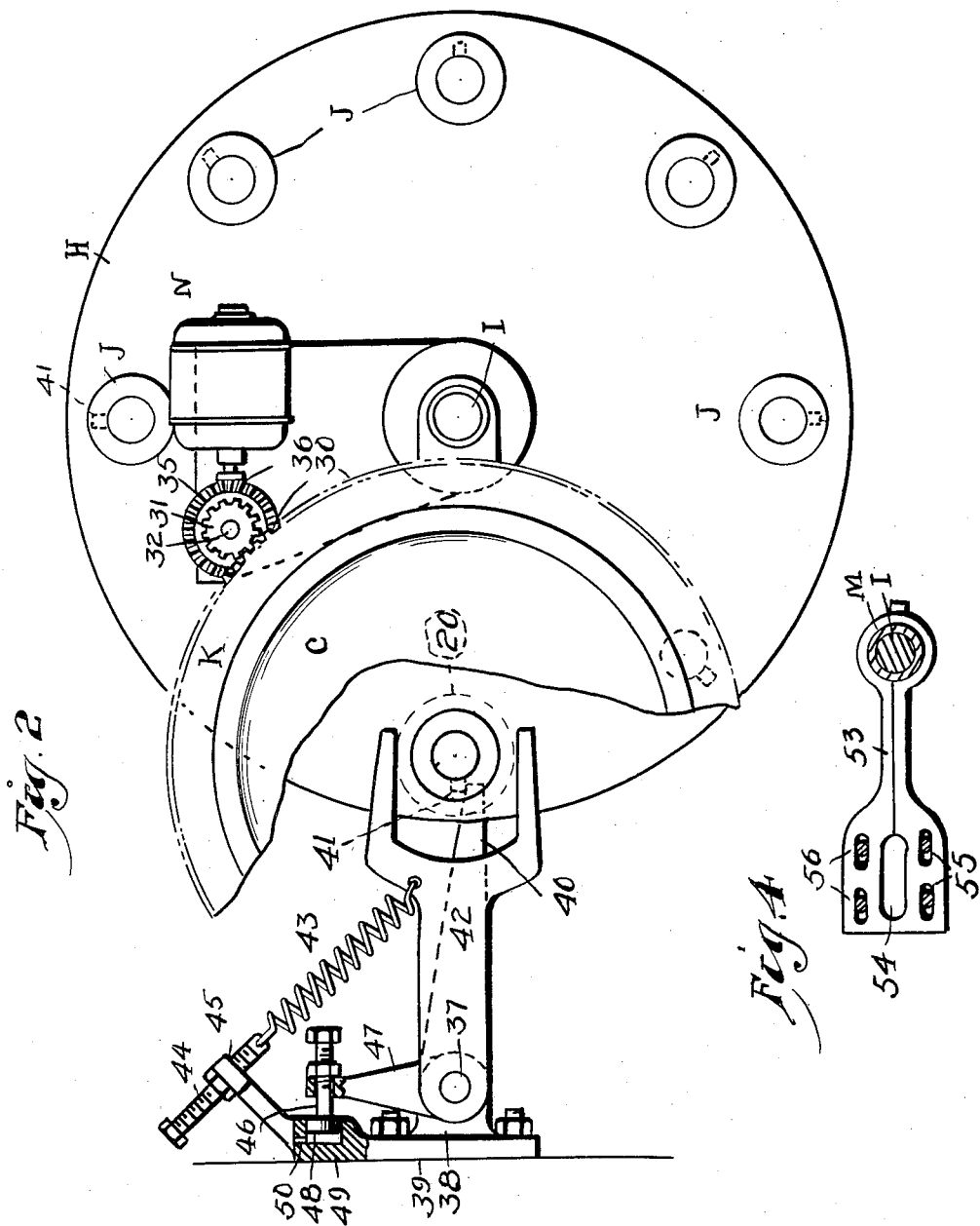

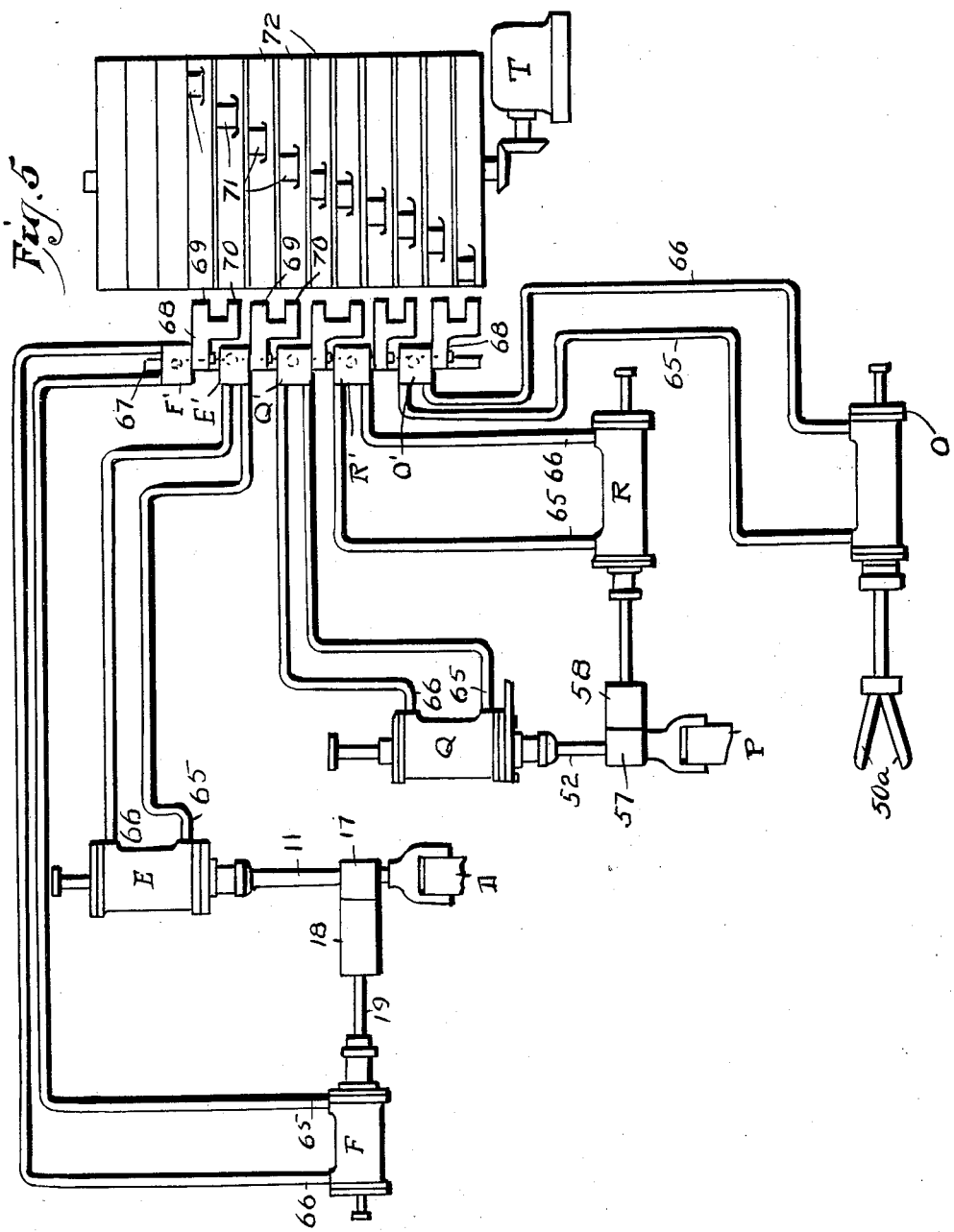

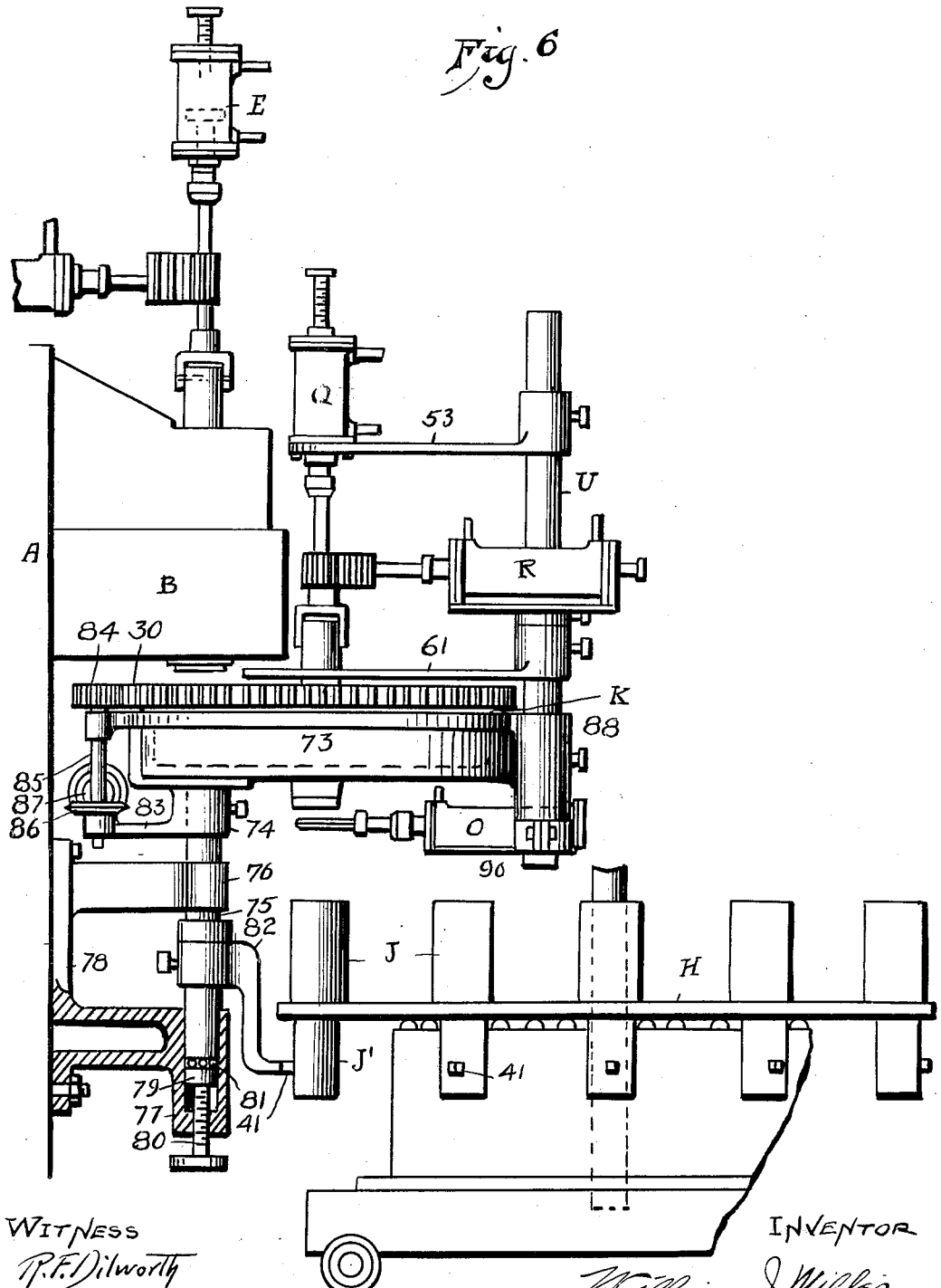

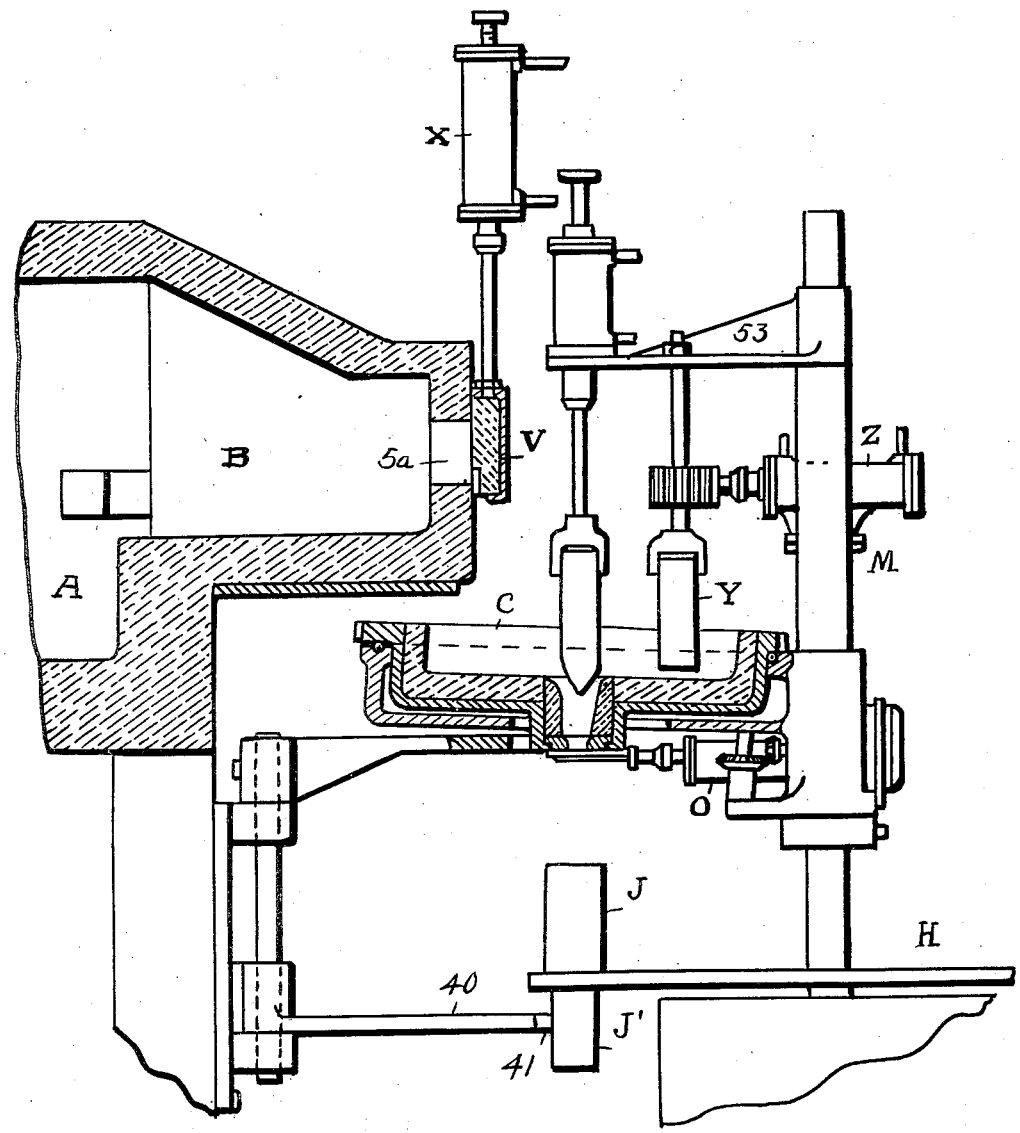

Patented Nov. 29, 1927.

1,651,036

UNITED STATES PATENT OFFICE.

WILLIAM J. MILLER, OF SWISSVALE BOROUGH, PENNSYLVANIA, ASSIGNOR TO HARTFORD-EMPIRE COMPANY, OF HARTFORD, CONNECTICUT, A CORPORATION OF DELAWARE.

APPARATUS FOR FEEDING GLASS.

Application filed August 15, 1922. Serial No. 581,927.

My invention consists in a new and improved process and apparatus for feeding molten glass to fabricating mechanism, and the same may applied to either stream feeding or feeding in the form of separated masses or gobs.

In glass fabrication, unless the glass in each mold charge is homogeneous as to temperature and viscosity the glass article produced either by pressing or blowing or both will be imperfect and "cordy", and in the case of hollow ware, such as bottles, the walls will be of uneven thickness. Again, unless the successive mold charges are uniform as to temperature and viscosity, the character and quality of the ware will vary, and the loss in the finer grades of goods becomes considerable.

In the automatic feeding of glass, the charges are usually formed from glass which is transferred from the main tank into a boot or relatively shallow receptacle, usually an extension of the tank itself, and the lack of homogeneity in a mold charge, and the lack of uniformity in a succcession of mold charges, are as a rule due to the existence in the feeding receptacles of zones or strata of glass of different temperatures. Thus where the glass flows from the tank into the feeding receptacle, zones or strata of colder glass tend to form next to the floor and side walls of the receptacle, leaving a zone or stratum of hotter glass along the top center. Where, as is the custom, the discharge orifice is in the nose or front end of the receptacle, the glass at the front and sides of the orifice is likely to be colder than that at the rear of the orifice or next to the tank from which the hot glass is being supplied. Thus the stream or portion of glass discharged through the orifice is usually composed partially of colder and partially of hotter glass, and, consequently, responds irregularly to the fabricating operations. Furthermore the proportion of the colder glass to the hotter glass in a succession of mold charges will vary, so that the fabricated product will vary in quality.

One of the objects which I have in view is the mixing or stirring of the glass in the feeding receptacle so that the glass discharged therefrom will be perfectly homogeneous in temperature and quality, so that, not only will each mold charge be homogeneous throughout, but homogeneity in a succession of mold charges will be obtained.

For this purpose I impart such movement to the feeding receptacle to which the glass is delivered from the tank that the different strata or laminæ are so intermingled at the discharge orifice so that the glass discharged from said orifice maintains the desired homogeneity.

Thus as a convenient embodiment I may provide a rotating feeding receptacle to which the glass is supplied from the tank, means being provided whereby the rotation of the receptacle causes a thorough stirring or mixing of the glass. Where the mold charges are formed as suspended gobs which are sheared off below the orifice, I may use a plunger or valve member reciprocating in the receptacle in relation to the orifice, and said member may itself be rotated in a direction opposite to the direction of the receptacle's rotation or the member may be non-rotating, and thus act as a stationary paddle or stirrer in a revolving bowl.

Where, as in case of a stream feeder, no reciprocating plunger, or its equivalent, is used to control the discharge of glass through the discharge orifice, but a valve member is used to close the discharge orifice when the feeder is not in operation, said valve member may depend into the glass while the feeder is in operation, and may be either stationary or may be given a movement opposed to the movement of the receptacle.

Another object which I have in view is the convenient feeding of glass from the feeding receptacle to continuously moving molds or other containers of the fabricating machine. Where fabricating machines are characterized by an intermittent or step by step movement of the molds which are thus halted in turn in the feeding position, a fixed feed or discharge orifice is practical, but a stream feed or a suspended gob feed has not been successfully applied to fabricating machines having continuously moving mold supports except by the provision of swinging troughs or slides which are unsatisfactory. I have solved this problem by causing the discharge orifice to move during the feeding operation in unison with the mold to which the mold charge is to be supplied.

As a practical and convenient apparatus for the accomplishment of these and other purposes which will hereafter appear, I provide new and improved feeding apparatus characterized by the provision of a rotating feeding receptacle which also swings or moves during the feeding operation in unison with the molds.

Other novel and highly useful features of construction and arrangement of parts will appear from the following description.

In the accompanying drawings, which are however merely intended to illustrate a practical embodiment of the principles of my invention without limiting the scope of the latter to the construction shown, Fig. 1 is a view partially in vertical section showing the principles of my invention embodied in a feeder provided with a rotating and oscillating feeding receptacle and operating in connection with a rotary mold table fabricating machine, the latter being indicated only in a general way; Fig. 2 is a plan view of the same, certain of the parts being omitted and others broken away for the sake of clearness; Fig. 3 is a detail in section of one of the fluid pressure cylinder mechanisms; Fig. 4 is a detail of the support for one of said fluid pressure cylinders; Fig. 5 is a diagrammatic view showing a convenient method of timed control for the different operative elements; Fig. 6 is a view similar to Fig. 1 showing a modification; Fig. 7 is a view similar to Fig. 2 of said modification, and Fig. 8 is a view similar to Figs. 1 and 6 but showing other modifications.

The following is a detailed description of the principles of my invention as the same are illustrated in the drawings, reference being first had to Figs. 1, 2, 3 and 4.

A represents the tank or other source of supply of molten glass. B represents a boot or container, preferably in the form of a shallow extension of the tank. The glass is supplied to the boot B from the tank in any convenient manner, either automatically or otherwise, as by the constant level port or passage 1 which is shown guarded by the scum ring 2. Numerous other methods for supplying molten glass from a tank to feeding apparatus are well known in the art, such as siphonic means, and it will be understood that any one of the same may be substituted for the conventional constant level opening shown in Fig. 1.

In the embodiment of my invention illustrated in the drawings, the molten glass is supplied first from the tank A to the boot B, and thence from the boot B to the feeding receptacle C later to be described, but it will be understood that the glass may be supplied directly from the tank A to a feeding receptacle, if desired.

The glass in boot B is maintained at the proper working temperature, as by the gas-burners or wind pipes 3 extending through ports in the walls or roof of the boot. 4 represents a peep hole in the front of the boot.

The boot B is provided with a suitable outlet or orifice or passage through which the glass is supplied in any convenient manner to the feeding receptacle C. Thus, as a convenient arrangement, I have shown the orifice 5 in the floor of the boot B, the upper portion of said orifice being formed by the tapered bore of a removable bushing 6 while the lower portion of said orifice is formed by the tapered bore of the interchangeable mouth-ring 7. The walls, floor and roof of the boot are of refractory material supported by the metal frame or box 8 mounted on the front of the tank A. The bushing 6 and mouth ring 7 are shown held in place by a recessed metal ring 9 attached to the underside of the box 8.

The molten glass may be allowed to flow through the orifice 5 in the form of a continuous stream into the receptacle C, a valve D of refractory material extending down into the boot B through a bushing mounted in an opening in the roof of the boot, said valve, in the case of stream feeding, being lowered to cut off the flow through the orifice 5 when it is desired to cut off the supply of glass to the receptacle C, and being raised to open the orifice 5 when it is desired to resume the supply.

However, especially where the molten glass is fed from the receptacle C in the form of separated masses, such, for instance, as suspended gobs, I prefer to supply the glass to the receptacle C intermittently or in such a manner that the diminution of the supply of glass in the receptacle incident to the formation of the gobs, will be compensated for.

For this purpose I provide a reciprocating member working in relation to the orifice either in axial alinement thereto or in a plane transverse to the axis of the orifice.

Thus I show the valve D as a reciprocating plunger working in axial alinement with the orifice, and with its movements timed with the discharge of gobs from the receptacle C.

Thus I have shown the upper end of the valve D pinned to a clevis 10 secured to the lower end of the piston rod 11 of the piston 12 which works in the fluid pressure cylinder E supported in any convenient manner above the boot B. Fluid pressure is admitted to and relieved from the opposite ends of cylinder E in any convenient manner. In Fig. 3 I show in detail the preferred construction of the cylinder E. Thus the upper end of the cylinder is provided with a threaded hole through which is screwed the threaded shaft 13 which acts as an adjustable stop to limit the upward movement of the piston 12, and, consequently, the ascent of the valve D relative to the orifice 5. The head or lower end of the cylinder is provided with a threaded axial opening 14 in which is adjustably screwed the sleeve 15, the inner end of the sleeve limiting the downward movement of the piston 12 and, consequently, the descent of the valve D relative to the orifice 5. 16 is a packing gland in the sleeve 15 through which the piston rod 11 extends.

To prevent the formation of zones or strata of different temperatures and viscosities in the glass contained in the boot B, which would result in a lack of uniformity in the glass supplied to the feeding receptacle C, I prefer to provide means for stirring or mixing the glass in the boot B.

Separate means may be provided for this purpose, but I prefer to accomplish this function by means of the valve D to which I impart a rotary motion which may occur while the valve is free from vertical movement, or simultaneously with such movement.

Thus I show a pinion 17 fixed on the stem 11 and meshing with a rack 18 mounted on the piston rod 19 of the horizontally disposed fluid pressure cylinder F which may be mounted on top of the tank A. It is evident that the proper admission of fluid pressure to the cylinder F will cause the rack 18 to reciprocate, thus rotating the valve D and thoroughly intermingling the glass in the boot B, forming a body of glass of uniform temperature and viscosity. The engaging surfaces of the pinion 17 and the rack 18 are sufficiently extended to allow for the vertical movement of the pinion with the stem 11 without impairing the meshing of the two elements.

In the case of stream feeding from the boot B to the receptacle C, when the feeder is in operation, the valve D may be raised to open the orifice 5 but may still be partially immersed in the molten glass and be rotated to act as a mixing tool.

C, already incidentally refered to, is the feeding receptacle from which the glass is fed, either in the form of a stream, or as separate gobs or masses, to the fabricating machine. Such machine is indicated by the reference letter G and is shown as characterized by a mold support or table H rotating on the machine standard I as an axis. In the drawings the motion of the table H is assumed to be counterclockwise. J represents a plurality of molds or containers mounted upon the table H and brought in turn into the feeding zone or position by the rotation of the table H.

To maintain the supply of molten glass in the receptacle C at uniform temperature and viscosity, I prefer to provide means for mixing or stirring the glass in the receptacle, thus constituting said receptacle what might be termed a "mixing bowl".

To adapt my invention for more convenient use in connection with a fabricating machine whose molds move continuously as compared to a step by step or intermittent motion, I provide means whereby the discharge orifice of the feeding receptacle moves with the molds through the feeding zone.

It will of course be understood that, if desired, the mixing or stirring function may be omitted, but the homogeneity and uniformity of the gobs, thus obtained, is a very decided advantage. On the other hand the feeding receptacle need not move with the molds, as for instance in the use of my invention with fabricating machines characterized by an intermittent, or step by step, movement of the molds, the latter being stationary during the feeding operation.

In the embodiment of my invention illustrated in the drawings I show the receptacle equipped both for mixing the glass contained therein, and for movement with the molds during the feeding operation.

Thus I have shown the receptacle C in the form of a relatively shallow bowl of refractory material and mounted in a metal pan K. The bowl C is provided with an axial opening in its bottom which registers with a similar opening in the pan K, the wall of the opening in pan K being prolonged downwardly to form the annular collar 20. 21 is a tapered bushing inserted up into the registering openings in the bowl and pan, and 22 is an interchangeable mouth-ring whose bore together with that of the bushing 21 forms the discharge orifice of the feeding receptacle. The bushing and mouth-ring are of refractory material and may be removably held in place, as by the metal ring 23 bolted to the lower end of the collar 20.

The pan K, in which the receptacle C is supported, is rotatably mounted in an annular support or frame 24 which may be integral with or mounted on an elongated sleeve M. The sleeve M is rotatably mounted on the standard I of the machine, being shown supported from below by the collar 25 which is fixed on the standard as by the set screw 26. The collar is adjustable on the standard, so that any desired elevation may be given to the sleeve M and the receptacle C. Ball bearings 27 may be interposed between the sleeve and the collar.

The pan K is provided with a perimetral flange 28 by means of which it is mounted in the support 24, ball bearings 29 being interposed between the under surface of said flange and said support. 30 represents an annular series of cog teeth disposed about the outer face of the flange 28, and meshed with the pinion 31. The pinion 31 is fixed on the upper end of a vertically disposed shaft 32 journaled in an upper bearing in the support 24 and a lower, step bearing 33 in the shelf 34 integral with or mounted on the sleeve M.

35 is a bevelled pinion mounted on the shaft 32 and meshing with a smaller bevelled pinion 36 mounted on the shaft of a motor N which is mounted on the shelf 34.

It is thus evident that the receptacle C may be rotated on its axis. This rotary movement may be in either direction.

The receptacle C is also shown mounted to swing on the column I as an axis.

Thus 37 is a vertically disposed shaft journaled in bearings 38 extending from a plate 39 secured to the front of the tank or some other fixed support. The lower end of said shaft has fixed thereto the radial arm 40 adapted to be engaged by a vertically disposed lip 41 on the parison plunger cylinders J', one of which is vertically alined below each of the molds J, so as to rock the shaft 37 clockwise in Fig. 2. The upper end of said shaft 37 is provided with a second radial arm 42 in the same vertical plane as arm 40, and whose bifurcated outer end straddles the depending axial collar 20 of the pan K. It is evident that when the shaft is rocked the pan K and receptacle C will be swung counterclockwise in Fig. 2, moving in unison with the mold until the striking arm 40 is disengaged from the rib 41. It is during this movement of the receptacle C that the mold charge is deposited or dropped into the mold J which is moving in unison with the receptacle C. To return the receptacle C to its position of rest, I provide a helical spring 43 whose one end is secured to the arm 42 and whose other end is attached to the end of an adjustment bolt 44 screwed through a threaded collar 45 on a bracket extending angularly from the plate 39. Thus when the lip 41 is disengaged from the arm 40, by the continued movement of the mold table, the spring 43 automatically returns the receptacle C clockwise to its starting position. To prevent jarring, the return of the receptacle is cushioned. Thus the bolt 46 is screwed through a threaded hole in a short arm 47 carried by the shaft 37, and the end of said bolt is provided with a piston 48 which works in a dash pot 49 formed integral with the plate 39 and provided with a choked air-port 50 to permit of a retarded relief of pressure.

As already stated the feed of molten glass to the molds from the receptacle C may be in the form of a continuous stream severed at proper intervals to produce the desired mold charges, or the feed may be in the form of separated masses, such, for instance, as suspended gobs.

In either method of feeding, mechanical shears should be provided, by means of which, when the proper quantity of glass to form the desired mold charge has been protruded from the discharge orifice, the same is sheared off and allowed to drop into the mold.

I have illustrated in Fig. 1 a fluid pressure cylinder-mechanism O, operating the shear blades 50ª located below the discharge orifice, but any of the many suitable shear mechanisms known in the art may be used, as will be evident to those skilled in glass machinery. The shear cylinder O may be mounted on the shelf 34 carried by the sleeve M.

I prefer to use in connection with my invention a feed of the suspended gob type, and I therefore provide the vertical disposed valve or plunger P working in the receptacle C in relation to the feeding orifice.

Where stream feeding, instead of gob feeding is to be used, the element P may be lowered to close the orifice when the feeder is not in use, and may be raised to open the orifice when the feeder is to be put in operation.

Where gob feeding is used, the element P is reciprocated relative to the orifice in the manner characteristic of gob feeders of the plunger type. Thus I attach the upper end of the member P to the clevis 51 on the lower end of the stem 52 which forms the piston rod of the fluid pressure cylinder Q. The cylinder mechanism is similar in construction to the cylinder mechanism E to permit of proper adjustment of the plunger stroke. The cylinder Q is mounted on the outer end of a support 53 extending radially from the rotary sleeve M, and adjustable vertically and circumferentially on said sleeve. The outer end of said support is longitudinally slotted as shown at 54 in Fig. 4 to provide clearance for the gland and piston rod of the cylinder mechanism, and four bolt holes 55 which are provided for the bolts 56 which clamp the cylinder Q on the support, said bolt holes being slotted to permit adjustment of the position of the cylinder along said support. Thus the position of said cylinder relative to the sleeve M may be adjusted radially, circumferentially and longitudinally of said sleeve.

If desired I may use the member P as a mixing tool, either in combination with the rotating receptacle, or while said receptacle is stationary. Thus I may fix on the stem 52 a gear 57 meshing with the rack 58 on the end of the piston rod 59 of a horizontally disposed fluid pressure cylinder mechanism R mounted on a shelf 60 carried by the sleeve M. The receptacle C is provided with a heat conserving lid 61 supported from the sleeve M and provided with an opening 62 for the member P, and also with one or more ports 63 for the gas burners or wind pipes 64 which maintain the glass at proper temperature. The lid 61 is cut away to permit the glass to be discharged from the orifice 5 of the boot B into the receptacle C, the portion of said receptacle which receives the glass being preferably eccentric of its axis.

In Fig. 5, I show, diagrammatically, means for the timed operation of the various actuating elements which are illustrated in the drawings as the fluid pressure cylinder-mechanisms E, F, O, Q and R, such timing being adjustable.

Thus I show a vertically arranged battery or four-way valves F', E', Q', R' and O', mounted on a suitable support, not shown, and connected up by the pipes 65 and 66 to the opposite ends of the cylinders F, E, Q, R and O, respectively. Said valves are also connected to the fluid pressure supply pipe 67. Each of said valves is thrown to connect one end of its associated cylinder to pressure and relieve pressure from the other end of the same by means of the double pawl operating levers 68 whose opposed pawl 69 and 70 are engaged by the rollers 71 of the ring members 72 of the rotary timer S driven by the motor T.

The particular structures of the valves and of the timer operating the same form no part of the present application but are the subject matter of a patent application to be filed by me in the United States Patent Office.

However the members 72 are rotarily adjustable relative to the timer so that the operation of any of the operative elements may be adjusted relative to the others.

It is evident from the foregoing that the glass may be fed in the form of predetermined mold charges from the receptacle C to the molds J as the latter reach or move through the feeding position or zone.

It is further evident that the glass discharged from the boot B is deposited along the outer edge of the receptacle C, and moves gradually in a more or less spiral course to the discharge orifice of the receptacle. The rotation of the receptacle tends to mix the strata of glass together, and such mixture is rendered more effective, and a greater uniformity and homogeneity is obtained at the orifice, by the use of the valve or plunger P which may be reciprocated, as in suspended gob feeding, or may be stationary, as in stream feeding, thus in either case acting as a stationary paddle in a revolving mixing bowl. Where however the valve or reciprocal plunger is itself rotated, preferably in a direction the reverse to that of the receptacle, the mixture is complete and absolute uniformity and homogeneity are assured.

In Figs. 6 and 7 I show a modification wherein the feeding receptacle is mounted to swing on an axis parallel to the axis of the mold support, instead of coincident therewith as already described.

Thus the annular support 73 in which the pan K and the feeding receptacle C are rotatably mounted is provided below and eccentrically with a collar 74 which is fixed on the upper end of a vertically disposed shaft 75 which is journalled in an upper sleeve bearing 76 and a lower step bearing 77 both extending from a plate 78 fixed to the front of the furnace A. The shaft 75 is adjustable vertically by means of a pillow block 79 in the step bearing 77 which is moved in the same by means of a screw bolt 80 extending up through the bottom of said step bearing, ball bearings 81 being interposed between the block 79 and the lower end of the shaft 75. The shaft 75 is provided with a radially extending angular arm 82 which is engaged by the ribs 41 of the cylinders J' to swing the receptacle C.

While it is true that the molds and the receptacle turn on different axes, in practice there is no difficulty in depositing the gobs or charges in the molds.

In this modification the motor N is mounted on a shelf 83 integral with or carried by the support 73, the pan K being driven by means of a gear 84 meshing with the teeth 30 of said pan, and mounted on the upper end of a shaft 85 journalled in the frame work of the support 73, and having its lower end provided with a bevelled gear 86 meshing with a smaller bevelled gear 87 on the shaft of the motor N.

In this case the bracket 53 which carries the plunger cylinder Q is mounted on the upper end of a supporting standard U whose lower end is adjustably secured in a vertically disposed sleeve 88 integral with the annular support 73. The cover 61 of the receptacle C and the shelf 89 upon which the cylinder R is mounted are carried by the standard U. The sleeve 88 also carries the shelf 90 upon which the shear cylinder O is mounted.

The receptacle is automatically returned to its position of rest, after a feeding operation. Thus I show the radial arm 91, fixed on the shaft 75, connected by the adjustable helical spring 92 to a fixed point such as the front of the furnace A or the plate 78. A pneumatic cushion device 93 is provided to prevent jars.

In Fig. 8 a number of modifications are suggested. Thus I show therein the discharge orifice 5ª of the boot B in the front, instead of the floor, of the boot, and the travel of the glass through the same regulated by the vertically sliding gate V, which may be held elevated when the feeder is in operation to permit a continuous flow of glass, and then be depressed to close the orifice when the feeder is not in operation.

Or I may reciprocate the gate V by means of the fluid pressure cylinder X so that the glass is discharged from the orifice intermittently in separate masses.

In Fig. 8 I also show the receptacle C rotated on an axis inclined to the vertical, thus facilitating the mixing action. In Fig. 8 I also show a separate mixing tool Y depending into the supply of glass in the bowl C eccentrically of the axis of rotation of the latter. Said tool Y may be suspended from the support 53, and may, if desired, be rotated, preferably in the direction the reverse of that of the bowl C, as by means of a fluid pressure cylinder Z carried by the sleeve M.

Although for the sake of clearness in illustration of the principles of my invention I have described in detail the structures shown in the drawings, I do not wish to limit myself thereby, but claim broadly:—

1. In means for feeding glass to a mold or other receiver arranged to travel about an axis, the combination of a receptacle adapted to contain a supply of molten glass and provided with a discharge orifice through which the glass travels to form mold charges, and means for moving said receptacle about the same axes to cause the orifice to travel with the mold and vertically alined therewith during the feeding operation.

2. In means for feeding glass to a mold or other receiver arranged to travel about an axis, the combination of a receptacle adapted to contain a supply of glass and provided with a discharge orifice, means for discharging glass through said orifice to form mold charges, and means for moving the receptacle about the same axis to cause the orifice to travel with the mold and vertically alined therewith during the feeding operation.

3. In means for feeding glass to a mold or other receiver arranged to travel about an axis, the combination of a receptacle adapted to contain a supply of molten glass and provided with a discharge orifice, means for discharging portions of said glass through the orifice in the form of separate mold charges, and means for moving said receptacle about the same axis to cause the orifice to travel with the mold and vertically alined therewith during the feeding operation.

4. In means for feeding glass to a mold or other receiver arranged to travel about an axis, the combination of a receptacle adapted to contain a supply of molten glass and provided with a discharge orifice, means for discharging portions of said glass through said orifice in the form of suspended mold charges, and means for moving the receptacle about the same axis to cause the orifice to travel with the mold and vertically alined therewith during the feeding operation.

5. In means for feeding glass to a mold or other receiver arranged to travel about an axis, the combination of a receptacle adapted to contain a supply of molten glass and provided with a discharge orifice, means working in the glass relative to said orific for discharging portions of glass therefrom to form mold charges, and means for moving said receptacle about the same axis to cause the orifice to travel with the mold and vertically alined therewith during the feeding operation.

6. In means for feeding glass to a mold or other receiver arranged to travel about an axis, the combination of a receptacle adapted to contain a supply of molten glass and provided with a discharge orifice, reciprocal means working in the glass relative to said orifice for discharging separate mold charges, and means for moving said receptacle about the same axis to cause the orifice to travel with the mold and vertically alined therewith during the feeding operation.

7. In means for feeding glass to a mold or other receiver, arranged to travel about an axis, the combination of a receptacle adapted to contain a supply of glass and provided with a discharge orifice through which a portion of the glass travels to form mold charges, means for severing the glass protruding through said orifice, and means for moving said receptacle about the same axis to cause the orifice to travel with the mold and vertically alined therewith during the feeding operation.

8. In means for feeding glass to a mold or other receiver arranged to travel about an axis, the combination of a movable receptacle adapted to contain a supply of glass and provided with a discharge orifice through which a portion of the glass travels to form mold charges, means moving with the receptacle for severing the glass protruding through said orifice, and means for moving said receptacle about the same axis to cause the orifice to travel with the mold and vertically alined therewith during the feeding operation.

9. In means for feeding glass to a mold or other receiver arranged to travel about an axis, the combination of a movable receptacle adapted to contain a supply of molten glass and provided with a discharge orifice through which a portion of the glass travels to form mold charges, means working relative to said orifice to control the discharge of glass therethrough, means for severing the glass protruding through said orifice to detach the mold charges, and means for moving said receptacle about the same axis to cause the orifice to travel with the mold and vertically alined therewith during the feeding operation.

10. In means for feeding glass to a mold or other receiver arranged to travel about an axis, the combination of a movable receptacle adapted to contain a supply of molten glass and provided with a discharge orifice through which a portion of the glass travels to form mold charges, means working relative to said orifice to control the discharge of glass therethrough, means moving with said receptacle for severing the glass protruding through said orifice to detach the mold charges, and means for moving said receptacle about the same axis to cause the orifice to travel with the mold and vertically alined therewith during the feeding operation.

11. In means for feeding glass to a mold or other receiver arranged to travel about an axis, the combination of a movable receptable adapted to contain a supply of molten glass and provided with a discharge orifice through which a portion of the glass travels to form mold charges, reciprocal means working in the molten glass relative to said orifice to control the discharge of glass therethrough, means for severing the glass protruding through said orifice to detach the mold charges, and means for moving the receptacle about the same axis to cause the orifice to travel with the mold and vertically alined therewith during the feeding operation.

12. In means for feeding glass to a mold or other receiver arranged to travel about an axis, the combination of a movable receptacle adapted to contain a supply of molten glass and provided with a discharge orifice through which a portion of the glass travels to form mold charges, reciprocal means working in the molten glass relative to said orifice to control the discharge of glass therethrough, means moving with the receptacle for severing the glass protruding through said orifice to detach the mold charges, and means for moving the receptacle about the same axis to cause the orifice to travel with the mold and vertically alined therewith during the feeding operation.

13. In means for feeding glass to a mold or other receiver arranged to travel about an axis, in combination with a tank for molten glass, a receptacle in which a supply of molten glass is maintained from said tank, said receptacle being provided with a discharge orifice through which a portion of the glass travels to form mold charges, means for severing the glass protruding through said orifice to detach the mold charges, and means for moving said receptacle about the same axis to cause the orifice to travel with the mold and vertically alined therewith during the feeding operation.

14. In means for feeding glass to a mold or other receiver arranged to travel about an axis, in combination with a tank for molten glass, a movable receptacle, said receptacle being provided with a discharge orifice through which a portion of the glass travels to form mold charges, means for supplying glass in measured quantities from the tank to the receptacle, means for severing the glass protruding through said orifice to detach the mold charges, and means for moving the receptacle about the same axis to cause the orifice to travel with the mold and vertically alined therewith during the feeding operation.

15. In means for feeding glass to a mold or other receiver arranged to travel about an axis, in combination with a tank for molten glass, a movable receptacle, said receptacle being provided with a discharge orifice through which a portion of the glass travels to form mold charges, means for supplying glass in measured quantities from the tank to the receptacle, means moving with said receptacle for severing the glass protruding through said orifice to detach the mold charges, and means for moving the receptacle about the same axis to cause the orifice to travel with the mold and vertically alined therewith during the feeding operation.

16. In means for feeding glass to a mold or other receiver arranged to travel about an axis, in combination with a tank for molten glass, a shallow extension of said tank receiving glass therefrom and provided with a discharge orifice, a movable receptacle in which a supply of glass is maintained from said extension, said receptacle being provided with a discharge orifice through which a portion of the glass travels to form mold charges, means for severing the glass protruding through the orifice of said receptacle to detach the mold charges, and means for moving said receptacle about the same axis to cause the orifice to travel with the mold and vertically alined therewith during the feeding operation.

17. In means for feeding glass to a mold or other receiver arranged to travel about an axis, in combination with a tank for molten glass, a shallow extension of said tank receiving glass therefrom and provided with a discharge orifice, means for controlling the travel of glass through said discharge orifice, a movable receptacle in which a supply of glass is maintained from said shallow extension, said receptacle being provided with a discharge orifice through which a portion of the glass travels to form mold charges, means for severing the glass protruding through the orifice of said receptacle to detach the mold charges, and means for moving the receptacle about the same axis to cause the orifice to travel with the mold and vertically alined therewith during the feeding operation.

18. In means for feeding glass to a mold or other receiver arranged to travel about an axis, in combination with a tank for molten glass, a shallow extension of said tank receiving glass therefrom and provided with a discharge orifice, a movable receptacle in which a supply of glass is maintained from said shallow extension, said receptacle being provided with a discharge orifice through which a portion of the glass travels to form mold charges, means working in relation to the discharge orifice of said receptacle to control the passage of glass therethrough, means for severing the glass protruding through the discharge orifice of said receptacle to detach the mold charges, and means for moving the receptacle about the same axis to cause the orifice to travel with the mold and vertically alined therewith during the feeding operation.

19. In means for feeding glass to a mold or other receiver arranged to travel about an axis, in combination with a tank for molten glass, a shallow extension of said tank receiving glass therefrom and provided with a discharge orifice, a movable receptacle in which a supply of glass is maintained from said shallow extension, said receptacle being provided with a discharge orifice through which a portion of the glass travels to form mold charges, reciprocal means working in relation to the discharge orifice of said receptacle to control the passage of glass therethrough, means for severing the glass protruding through the discharge orifice of said receptacle to detach the mold charges, and means for moving the receptacle about the same axis to cause the orifice to travel with the mold and vertically alined therewith during the feeding operation.

20. In means for feeding glass to molds or other containers, the combination of a receptacle adapted to contain a supply of molten glass and provided with an orifice for the discharge of glass to the molds, a reciprocal member working in the glass in relation to said orifice to control the travel of glass therethrough, means for imparting a rotary movement to said receptacle, and means for imparting an opposed rotary movement to said reciprocal member, for the purpose described.

21. In means for feeding glass to molds or other containers, the combination of a receptacle adapted to contain a supply of molten glass and provided with a discharge orifice, means for moving said receptacle, and a tool inserted in the glass in said receptacle and resisting the movement of the glass imparted by the movement of the receptacle whereby the glass is intermingled to produce homogeneity, the position of said tool being eccentric to the axis of movement of said receptacle.

22. In means for feeding glass to molds or other containers, the combination of a receptacle adapted to contain a supply of glass and provided with a discharge orifice, means for rotating said receptacle, and a tool inserted in the glass and resisting the movement thereof imparted by the movement of the receptacle whereby the glass is intermingled to produce homogeneity, the position of said tool being eccentric to the axis of movement of said receptacle.

23. In means for feeding glass to molds or other containers, the combination of a receptacle adapted to contain a supply of molten glass and provided with a discharge orifice, a tool inserted in the glass in said receptacle, and means whereby opposed movements are imparted to said tool and said receptacle whereby the glass is intermingled to produce homogeneity, the position of said tool being eccentric to the axis of movement of said receptacle.

24. In means for feeding glass to molds or other containers, the combination of a receptacle adapted to contain a supply of molten glass and provided with a discharge orifice, a tool inserted in the glass in said receptacle, and means for rotating said receptacle and said tool in opposite directions whereby the glass is intermingled to produce homogeneity.

25. In means for feeding glass to molds or other containers, the combination of a tank for molten glass, a shallow extension thereof to which glass is supplied from said tank, said tank being provided with a discharge orifice, means for mixing the glass in said extension, a feeding receptacle receiving glass from said shallow extension and provided with a discharge orifice, and means for mixing the glass in said feeding receptacle.

26. In means for feeding glass to molds or other containers, the combination of a tank for molten glass, a shallow extension thereof to which glass is supplied from said tank, said tank being provided with a discharge orifice, means for mixing the glass in said extension, a feeding receptacle receiving glass from said shallow extension and provided with a discharge orifice, and means for controlling the discharge of glass from said last named orifice.

27. In means for feeding glass to molds or other containers, the combination of a tank for molten glass, a shallow extension thereof to which glass is supplied from said tank, said tank being provided with a discharge orifice, means for mixing the glass in said extension, a feeding receptacle receiving glass from said shallow extension and provided with a discharge orifice, means for controlling the discharge of glass from said last named orifice, and means for mixing the glass in said receptacle.

28. In means for feeding glass to molds or other containers, the combination of a tank for molten glass, a shallow extension thereof to which glass is supplied from said tank, said shallow extension being provided with a discharge orifice, means for mixing the glass in said extension, means for controlling the travel of glass through said discharge orifice, a feeding receptacle receiving glass from said extension and provided with a discharge orifice, means for controlling the travel of the glass through said last named discharge orifice, and means for mixing the glass in said receptacle.

29. In apparatus for feeding molten glass to molds or other containers, the combination of a receptacle adapted to contain a supply of molten glass and provided with a submerged discharge orifice, means for rotating said receptacle, and a rigid implement extending into the glass in said receptacle to control the discharge of glass from the outlet and rotating in a direction opposed to the direction of rotation of the receptacle.

30. In apparatus for feeding molten glass to molds or other containers, the combination of a receptacle adapted to contain a supply of molten glass and provided with a submerged discharge orifice, means for rotating said receptacle, a rigid implement extending into the glass in said receptacle to control the discharge of glass from the outlet and rotating in a direction opposed to the direction of rotation of the receptacle, and means for reciprocating said implement toward and away from the outlet.

31. In apparatus for feeding molten glass to molds or other containers, the combination of a receptacle for the molten glass having a submerged discharge orifice, means for rotating said receptacle, means for supplying molten glass to said receptacle, and a rigid implement extending into the molten glass in the receptacle in alinement with the orifice to control the discharge of glass therefrom and rotating in the direction opposite to that of the rotation of the receptacle.

32. In apparatus for feeding molten glass to molds or other containers, the combination of a receptacle for the molten glass having a submerged discharge orifice, means for rotating said receptacle with the axis of rotation coincident with said discharge orifice, means for supplying molten glass to said receptacle at a point eccentric to its axis of rotation, and a rigid implement extending into the molten glass in the receptacle in alinement with the orifice to control the discharge of glass therefrom and rotating in the direction opposite to that of the rotation of the receptacle.

33. In apparatus for feeding molten glass to molds or other containers, the combination of a receptacle for the molten glass having a submerged discharge orifice, means for rotating said receptacle, means for supplying molten glass to said receptacle, a rigid implement extending into the molten glass in the receptacle in alinement with the orifice to control the discharge of glass therefrom and rotating in the direction opposite to that of the rotation of the receptacle, and means for moving the implement toward and away from the orifice.

34. In apparatus for feeding molten glass to molds or other containers, the combination of a receptacle for the molten glass having a submerged discharge orifice, means for rotating said receptacle with its axis of rotation coincident with said discharge orifice, means for supplying molten glass to said receptacle at a point eccentric to its axis of rotation, a rigid implement extending into the molten glass in the receptacle in alinement with the orifice to control the discharge of glass therefrom and rotating in the direction opposite to that of the rotation of the receptacle, and means for moving the implement toward and away from the orifice.

35. In apparatus for producing a succession of mold charges of molten glass, the combination with a receptacle for the molten glass having a submerged discharge orifice, means for rotating said receptacle, a rigid implement extending into the molten glass in alinement with the orifice to control the discharge of glass therefrom, means for moving the said implement toward and away from the orifice, and a second rigid implement extending into the glass in the receptacle to coact with the rotary movement of the receptacle to mix the glass in the latter.

36. In apparatus for producing a succession of mold charges of molten glass, the combination with a receptacle for the molten glass having a submerged discharge orifice, means for rotating said receptacle, a rigid implement extending into the molten glass in alinement with the orifice to control the discharge of glass therefrom, means for moving the said implement toward and away from the orifice, a second rigid implement extending into the glass in said receptacle, and means for rotating the second mentioned implement.

37. In apparatus for producing a succession of mold charges of molten glass, the combination with a receptacle for the molten glass having a submerged discharge orifice, means for rotating said receptacle, a rigid implement extending into the molten glass in alinement with the orifice to control the discharge of glass therefrom, means for moving the said implement toward and away from the orifice, a second rigid implement extending into the glass in said receptacle, and means for rotating the second mentioned implement in the direction opposite to that of the rotation of the receptacle.

38. In apparatus for producing mold charges of molten glass, the combination of a receptacle for the molten glass provided with a submerged discharge orifice, means for rotating said receptacle on an axis inclined to the vertical, and a rigid implement working in the glass in the receptacle and in alinement with the orifice to control the discharge of glass from the orifice.

39. In apparatus for producing mold charges of molten glass, the combination of a receptacle for the molten glass provided with a submerged discharge orifice, means for rotating said receptacle on an axis inclined to the vertical, a rigid implement working in the glass in the receptacle and in alinement with the orifice to control the discharge of glass from the orifice, and means for rotating said implement on its longitudinal axis.

40. In apparatus for producing mold charges of molten glass, the combination of a receptacle for the molten glass provided with a submerged discharge orifice, means for rotating said receptacle on an axis inclined to the vertical, a rigid implement working in the glass in the receptacle and in alinement with the orifice to control the discharge of glass from the orifice, and means for rotating said implement on its longitudinal axis and in the direction the reverse of the direction of the rotation of the receptacle.

Signed at Pittsburgh, Pa., this 3rd day of August, 1922.

WILLIAM J. MILLER.